Patented Aug. 24, 1937

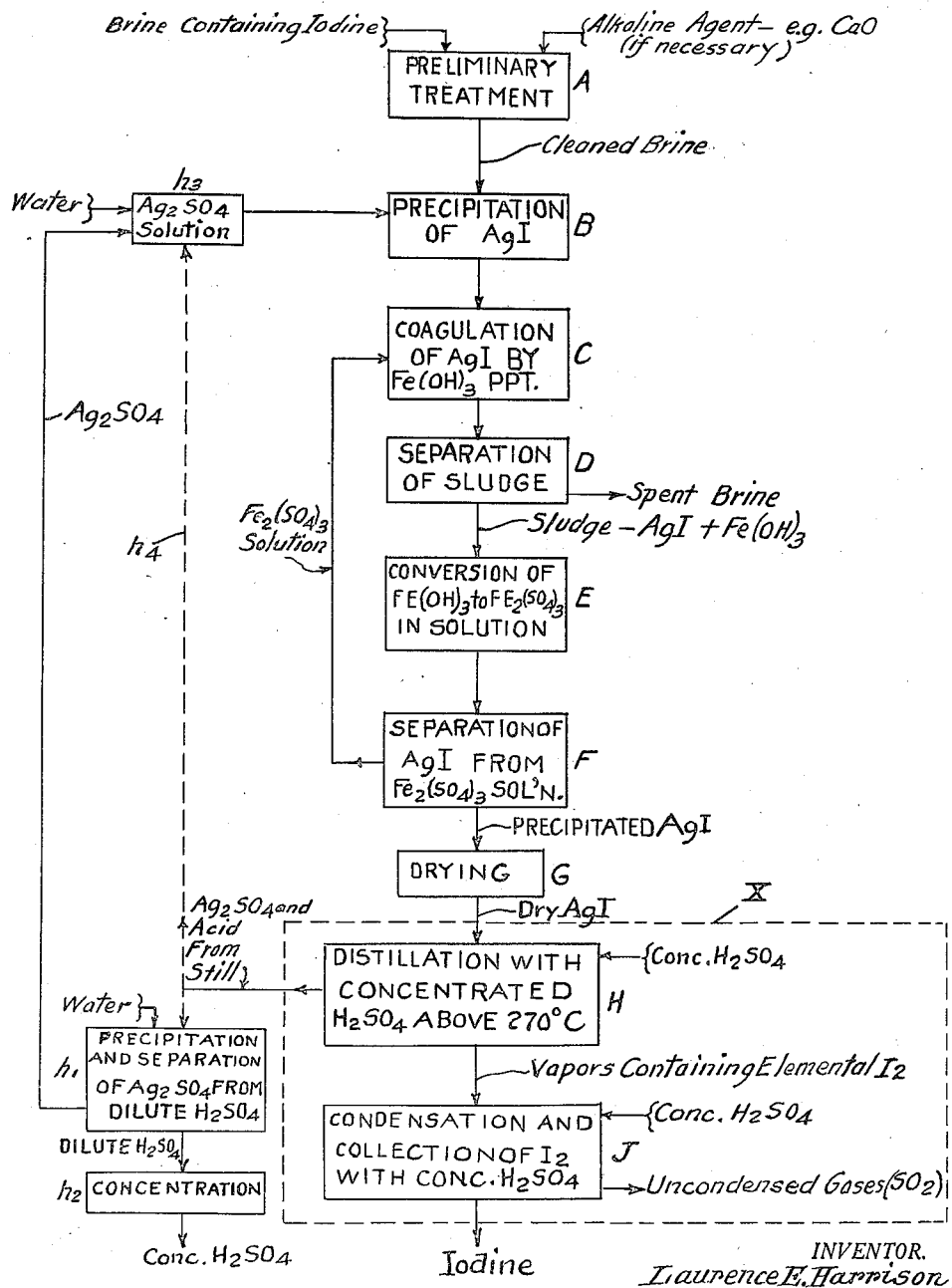

2,090,866

UNITED STATES PATENT OFFICE 2,090,866

PROCESS FOR RECOVERY OF IODINE

Laurence E. Harrison, Prescott, Ariz.

Application February 25, 1935, Serial No. 7,994

12 Claims. (Cl. 23—216)

This invention relates to improvements in methods for the recovery of iodine, and is particularly applicable to methods for the recovery thereof from oil field brines or other solutions containing iodine in chemically combined form, for example, in the form of sodium iodide or other iodide compounds. The invention is more specifically applicable to iodine recovery processes in which the iodine is first precipitated from the brine or other solution in the form of silver iodide and in which the precipitated silver iodide is then separated from the brine or solution and is further treated to recover iodine therefrom. An important feature of the invention is the provision of a method which may be advantageously employed for recovering iodine from a silver iodide precipitate such as above mentioned, or which may be utilized for the recovery of iodine from any silver iodide product regardless of the original source thereof or the means by which it was produced. The invention also comprises, however, a complete process for the recovery of iodine from an iodine-containing brine or solution, including precipitation of silver iodide, separation thereof from the solution, and subsequent treatment of the silver iodide to recover iodine according to the above-mentioned method.

The principal object of the invention is to provide a simple, economical, and advantageous method for recovering iodine from silver iodide, in such manner as to provide a high yield of elemental iodine of high purity.

A further object of the invention is to provide for the efficient recovery of elemental iodine from an iodine-containing brine or solution, in an economical manner and with a relatively small consumption of chemical reagents.

Other objects of the invention will be referred to hereinafter or will be apparent from the following description.

Insofar as it pertains to the steps of recovering iodine from silver iodide, the present invention may be regarded as an improvement or modification of procedures disclosed in patents to Coulter W. Jones, Nos. 1,837,777 and 1,927,663. The first of these patents discloses the treatment of silver iodide with hot concentrated sulphuric acid and an oxidizing agent such as bleaching powder, to form silver sulphate and liberate iodine, while the second discloses the distillation of a mixed silver bromide-silver iodide precipitate with sulphuric acid to distill off the halogens as hydrogen halides together with more or less free iodine, leaving a residue containing silver sulphate. Both of these patents also disclose the utilization or return of the silver sulphate formed in the above reactions, for treatment of brine to precipitate silver halide therefrom.

I have found that if the treatment of silver iodide with hot concentrated sulphuric acid is carried out under certain conditions, the iodine content thereof may be distilled off substantially wholly in the form of elemental iodine vapor, without requiring the addition of any oxidizing agent, and the elemental iodine thus vaporized may be recovered by condensation. In order to obtain vaporization of the iodine substantially wholly in the form of elementary iodine by this method, it is necessary that an excess of acid be used, that the acid be of high concentration, and that the distillation be carried out at a relatively high temperature, these conditions being more specifically described hereinafter.

I have also found that, by carrying out the condensation of the evolved iodine vapor in intimate contact with concentrated sulphuric acid at a relatively low temperature, that is, at a temperature well below the boiling point of iodine, I am enabled to economically recover substantially the entire iodine content of silver iodide as elemental iodine, including not only the elemental iodine evolved as such in the distilling operation, but also any relatively small proportion which may be evolved and vaporized in the form of hydriodic acid.

The complete process for recovering iodine from a brine or solution containing the same also preferably includes the precipitation of silver iodide by addition of a silver salt and the coagulation of the precipitated silver iodide by addition of an iron salt to form ferric hydroxide. This general procedure is described in patent to Charles W. Girvin, No. 1,911,273, but the preferred process of the present invention differs from the disclosures of said patent, in that the specific silver salt (silver sulphate) and the specific iron salt (ferric sulphate) which I prefer to utilize in these steps of the process may both be recovered or reproduced in later stages of the process, and may be re-utilized in the precipitation and coagulation steps in the treatment of a further quantity of brine, thus producing marked economies in operation.

The accompanying drawing is a flow sheet illustrating diagrammatically the sequence of steps in a preferred embodiment of my complete process, including the above-mentioned steps for recovery of iodine from silver iodide by distillation from hot concentrated sulphuric acid and collection in cold concentrated sulphuric acid, that part of the flow sheet which pertains to these particular steps being inclosed within the dotted rectangle indicated at X. This flow sheet will be further referred to in some detail in the following description of the process, which is directed particularly to the recovery of iodine from a brine containing the same in chemically combined form, for example, an oil field brine or the like. Such brines usually contain iodine in the form of sodium iodide, and in the following description it will be assumed that this compound is present, but it will be understood that substantially the same procedure may be employed and corresponding reactions carried out, in case other soluble iodide compounds are present, such as potassium iodide.

The first step of the process, indicated at A, may be generally referred to as a preliminary treatment, and may comprise any suitable form of treatment for removing from the brine objectionable impurities such as suspended or colloidal clay or other earthy material, or oleaginous materials, which commonly occur in oil field brines, and which if not removed would tend to interfere with the efficient recovery of iodine or to contaminate the recovered iodine product. A slight alkalinity of the brine is necessary to the procedure hereinafter described for coagulating the silver iodide to facilitate separation thereof, and it may be said that oil field brines and other natural brines containing iodine are usually sufficiently alkaline for this purpose. However, in case the brine is not alkaline or the natural alkalinity is insufficient, this preliminary treatment may also include, as indicated, the addition of an alkaline agent such as lime. Reference herein, and in the appended claims, to the treatment of the brine in alkaline condition, will be understood to refer to a brine which is either already alkaline when delivered to the process, or is rendered alkaline prior to such treatment.

The method used for the preliminary purification may consist, for example, in adding an iron salt such as ferric sulphate to the alkaline brine, resulting in formation of a flocculent precipitate of ferric hydroxide which traps or coagulates the suspended or colloidal impurities. The resulting precipitate, together with entrapped impurities, may be separated as a sludge from the brine, either by settling or in any other desired manner. Other methods of preliminary purification, such as sand filtration or charcoal adsorption, may be employed if desired. Also, it will be understood that this step may be entirely omitted if the brine is sufficiently free from impurities such as above-mentioned to make the preliminary removal thereof unnecessary.

The brine then passes to step B, in which silver sulphate is added, preferably in the form of an aqueous solution as indicated at $h_3$, this silver sulphate being preferably produced or recovered at a later stage of the process. The brine is preferably agitated moderately during this step, at about ordinary atmospheric temperature, until the iodine content thereof is sufficiently completely precipitated as silver iodide according to the following equation:

(1) $2NaI + Ag_2SO_4 = 2AgI + Na_2SO_4$

The amount of $Ag_2SO_4$ added is preferably only about sufficient to react with the sodium iodide present in the brine, not only for the sake of economy but also in order to substantially prevent precipitation of silver bromide or silver chloride along with the silver iodide, in case the brine also contains soluble bromide or chloride salts.

The silver iodide thus formed is usually quite finely divided and consequently difficult to separate from the brine. Therefore, it is next coagulated, as indicated at C, by adding to the alkaline solution a ferric salt, such as ferric sulphate, which is also preferably produced at a later stage of the process. Ferric chloride, however, may also be used for this purpose. The ferric salt, which is preferably also added in the form of an aqueous solution, reacts with alkaline compounds present in the brine, to form a flocculent precipitate of ferric hydroxide which coagulates, adsorbs or otherwise entraps the silver iodide, forming a mixed precipitate or sludge containing ferric hydroxide and silver iodide which may be relatively easily separated from the brine.

The separation of this sludge is preferably effected by removing the entire suspension from the chamber in which the precipitation and coagulation were effected and subjecting the same to a separating operation as indicated at D, for example, by gravity thickening or settling, filtration, centrifuging or flotation, and the spent brine is then discharged to waste or for further treatment or utilization.

The sludge is then treated to dissolve the ferric hydroxide, as shown at E. This may be accomplished by leaching or washing with dilute sulphuric acid, resulting in the formation and solution of ferric sulphate while leaving the silver iodide undissolved. This washing or leaching may be carried out in the same separating apparatus as was used to separate the mixed sludge from the brine, or the sludge may be agitated with the dilute sulphuric acid and the mixture again filtered or otherwise separated, as indicated at F. In any case, the precipitated silver iodide is obtained substantially free from ferric hydroxide or other salts, and there is also obtained a solution of ferric sulphate which may be returned for utilization in step C, as above described, and as shown on the accompanying flow sheet.

The silver iodide may, if desired, be washed to remove residual brine or ferric sulphate solution, and is then dried as indicated at G. If filtration is employed in the separating or washing operation, the drying may be partially effected by blowing the deposited silver iodide with air or steam in the filter, but it is desirable in any case to complete the drying thereof by heating to a suitable temperature, such as 200° to 400° C. or higher. This heating may be conducted in an oxidizing atmosphere, and may also serve to remove small amounts of organic impurities present, either by distillation or combustion thereof. The temperature should not be raised sufficiently to cause fusion or decomposition of the silver iodide.

Referring now to the steps which pertain to the recovery of elemental iodine from silver iodide, shown in the portion of the flow sheet indicated at X, silver iodide produced as above described or obtained in any other manner is first subjected to distillation in the presence of hot concentrated sulphuric acid as at H. For this purpose the dry silver iodide may be introduced into a closed still with a suitable quantity of concentrated sulphuric acid, somewhat in excess of that required to complete the reactions given below, and preferably in sufficient amount to provide a fairly fluid mixture for heating in the still. For example, I may advantageously use from one and one-half parts to three parts by weight of concentrated sulphuric acid to one part of silver iodide, although a larger, or possibly somewhat smaller, proportion of acid may be employed. The concentration of the acid used should be quite high, as I have found that restricting the amount of water present in both the distillation and collection operations serves to promote the efficient recovery of elemental iodine. I prefer, therefore, to use acid containing at least 93% or more $H_2SO_4$, and better results are obtained if the concentration is from 95% to 98% $H_2SO_4$. I may also use 100% acid or even fuming sulphuric acid, the latter having certain advantages as hereinafter pointed out, and the term "concentrated sulphuric acid" as used herein and in the appended claims will be understood to also include fuming sulphuric acid.

It may be advantageous to introduce the silver iodide and the requisite amount of sulphuric acid into the still gradually or in successive batches instead of all at one time, the amount of acid present being at all times sufficient to maintain the contents of the still in a fluid condition. The following may be given as a specific example:

100 lbs. of 96% $H_2SO_4$ are heated in a closed still, provided with an exit pipe for evolved vapors, to a temperature of 300° C. 100 lbs. of silver iodide in suitably divided condition, either finely ground or in the form of lumps, are then gradually added by a suitable mechanical feeder, while simultaneously gradually introducing additional 96% $H_2SO_4$ at a rate sufficient to maintain the desired fluidity, the total additional amount of acid thus added being, for example, from 50 to 200 lbs.

The still is heated to a temperature above 270° C. and preferably above 300° C. The reactions occurring may be written as follows:

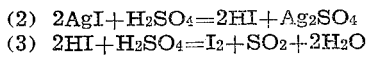
(2) $2AgI+H_2SO_4=2HI+Ag_2SO_4$
(3) $2HI+H_2SO_4=I_2+SO_2+2H_2O$

That is, the silver iodide is first dissolved by the sulphuric acid, forming hydriodic acid and silver sulphate, and the hydriodic acid is then oxidized by the sulphuric acid to form iodine, accompanied by the formation of $SO_2$ and water. These two reactions may be considered as combined into one total reaction, as follows:

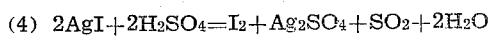
(4) $2AgI+2H_2SO_4=I_2+Ag_2SO_4+SO_2+2H_2O$

The elemental iodine thus produced is distilled off, possibly with a small proportion of hydriodic acid, which may have been formed by Equation (2) and removed by distillation before having reacted by Equation (3).

The $SO_2$ also passes off a gas and, at the temperature of distillation, water may also be vaporized and pass out of the still with the iodine vapor. Such liberation of water vapor with the iodine may be eliminated or reduced, however, by the use of fuming sulphuric acid, that is, acid containing free $SO_3$, or by the introduction of $SO_3$ gas into the still, thus providing an excess of $SO_3$ which will combine with the water formed by the above reactions, to form $H_2SO_4$. By using a sufficiently high temperature and maintaining the acid in the still at a sufficiently high concentration of total $SO_3$, I am enabled to obtain evolution of substantially all the iodine in elemental form.

The temperature and concentration of acid in the still are maintained sufficiently high to cause evaporation of a portion of the $H_2SO_4$, which passes off with the iodine vapor and $SO_2$, and ratio of $H_2SO_4$ to $H_2O$ in the evolved vapors is advantageously maintained sufficiently high to permit the use of cast iron equipment in the condensing and collecting operation.

The next step consists in condensation and collection of the elemental iodine, which is preferably carried out by condensing the vaporized iodine in contact with concentrated sulphuric acid at relatively low temperature, as shown at J. In this operation, the vapors leaving the still and containing iodine vapor together with $SO_2$ and possibly water vapor, may be passed in contact with concentrated sulphuric acid at a temperature well below 184° C., the boiling point of iodine, and preferably below 100° C. This operation may be carried out in a scrubbing tower or other apparatus providing effective contact between gas and liquid. The iodine vapor is thus condensed and collected in the cool acid, and any hydriodic acid contained in the vapors from the still will also be converted into elemental iodine by reaction according to Equation (3) above, and the iodine thus formed will also be collected. The apparatus should, of course, be provided with means for cooling the collecting acid and with means permitting collection or accumulation of the collected iodine in some part thereof.

The acid employed in this condensing and collecting operation should also have a high concentration of $H_2SO_4$, preferably about 93% or more, and the concentration thereof may advantageously be from 95 to 98%. I may also use 100% acid in this step, or even fuming sulphuric acid, if desired. The sulphuric acid evaporated from the still as above described will be largely condensed along with the iodine, so that there will be a continual accumulation of this condensed acid in the collecting acid. By maintaining this acid at a high concentration, it is possible to remove this accumulated or excess acid from the condensing operation and to make use thereof in the distilling operation, thus reducing the amount of fresh acid which is required in said distilling operation.

In some cases, the vapors leaving the still and containing sulphuric acid vapors together with iodine vapor, may simply be passed through a condenser so as to simultaneously condense the iodine and sulphuric acid, this condensed acid serving to provide the necessary sulphuric acid for contact with the iodine during the condensing and collecting operation. In this case also portions of this condensed acid may be removed and returned to the distilling operation.

The iodine thus collected may be in either solid or liquid form, depending upon the temperature of the collecting acid, but in either case it will be substantially undissolved in the acid and will tend to settle to the bottom thereof due to its greater specific gravity. If collected in liquid form, it may be separated from the acid by decantation, that is, by either removing the acid layer from above the liquid iodine layer, or by withdrawing the liquid iodine from below the acid layer. If collected as a solid, it may be separated from the acid in the divided condition in which it is collected, as by settling or filtration.

Other methods of separating the iodine from the collecting acid may also be employed, such as the methods described in Charles W. Girvin patent, No. 1,857,632, or in Coulter W. Jones patent, No. 1,895,929.

The iodine thus recovered may, if desired, be subjected to any suitable treatment for further purification, or may be marketed or used without any further purification treatment.

The $SO_2$ and any other gases not condensed or absorbed by the low temperature sulphuric acid in the collecting operation J may be discharged from this operation, and may be passed to waste or recovered or utilized in any desired manner.

When the distillation step H has proceeded to the point where the iodine has been substantially completely driven off or further evolution of iodine substantially ceases, the remaining acid containing silver sulphate in solution may be removed from the still and diluted with water. In case it is desired to recover the sulphuric acid, I may add a quantity of water sufficient to reduce the $H_2SO_4$ content of the solution to about 30% or below, and cool it to a relatively low temperature, for example, to about atmospheric temperature, whereupon the major portion of the silver sulphate is precipitated and may be separated from the dilute acid in any suitable manner, as for example by settling or filtration. These operations are indicated at $h_1$ in the accompanying flow sheet. The silver sulphate thus recovered may be dissolved in water to form a silver sulphate solution as indicated at $h_3$, which may be returned to the process at B for precipitation of silver iodide from a further quantity of brine. It will be understood that, if an objectionable quantity of acid is retained by the separated silver sulphate, such silver sulphate may be washed to remove such residual acid, prior to being returned to the process as above described.

The dilute sulphuric acid from $h_1$ may be concentrated by evaporation, as shown at $h_2$, and the concentrated acid thus recovered may be reutilized in the distillation step H.

By using a relatively small proportion of acid in the distillation step H, the amount of residual acid retained with the silver sulphate at the completion of the distillation may be so small as to make it commercially uneconomical to recover and re-concentrate it as above described. For example, if only about one and one-half parts of concentrated sulphuric acid are used, to one part of silver iodide, and a portion of the acid is distilled over with the elemental iodine as above described, the solution remaining in the still may be made to contain about 25% $H_2SO_4$ and 75% $Ag_2SO_4$. This solution is fluid while hot (above 270° C.) and may be mixed with hot water at $h_3$ (as indicated by the dotted line $h_4$), causing the $Ag_2SO_4$ to first precipitate in finely divided form, but upon further dilution the $Ag_2SO_4$ is redissolved. Since only about 0.41 pound of $H_2SO_4$ is contained in this dilute solution, per pound of iodine produced, it is not commercially economical to recover and re-concentrate it, and the slightly acid dilute solution of $Ag_2SO_4$ thus obtained may be added to the brine in step B, the amount of acid therein being insufficient to appreciably reduce the alkalinity of the brine when said solution is added in the necessary proportion to precipitate the iodine content of the brine as silver iodide. Because of its greater simplicity, this method of recovering and re-using the silver sulphate may in many cases be preferable to the procedure first described.

It will be apparent from the above description that the present invention not only provides a novel and advantageous method for treating silver iodide to recover elemental iodine therefrom, as shown in steps H and J, but also provides a complete process for recovery of iodine from brine, including these steps as a part of said process, and also including a certain advantageous sequence of prior operations by which the iodine content of the brine may be economically recovered in the form of silver iodide, the entire process being such as to provide high economy in operation, due to the fact that the products obtained at certain stages thereof may be employed as reagents at other stages thereof.

Although the specific procedure above described represents a preferred embodiment of the process, numerous modifications may be made therein.

For example, I may, if desired, introduce oxygen into the still in step H, in order to obtain reaction thereof with $SO_2$ formed by Equation (4), in the presence of the iodine or iodine compounds present, to form sulphuric acid or compounds thereof and thus eliminate or reduce the amount of $SO_2$ in the vapors leaving the still. The following reaction, for example, may occur:

(7) $2AgI + SO_2 + O_2 + H_2O = Ag_2SO_4 + 2HI$

The hydriodic acid thus produced will react according to Equation (3) to form iodine, so that the total reaction brought about by the oxygen may be regarded as:

(8) $2AgI + H_2SO_4 + O_2 = Ag_2SO_4 + I_2 + H_2O$

Comparing this with Equation (4), it will be seen that the introduction of oxygen is of material advantage, in that it serves to bring about the conversion of a given amount of silver iodide to elemental iodine with a smaller consumption of sulphuric acid and a smaller production of water vapor, and with a reduction in the liberation of $SO_2$.

I have mentioned above that the dilute sulphuric acid recovered at $h_1$ may be concentrated and used in step H. However, if desired, such dilute acid may be employed in step E for dissolving the ferric hydroxide.

It will be understood that where I have shown or described the introduction into the process of reagents produced at another stage thereof, additional amounts of such reagents from other sources may also be supplied if the amount obtained in the process is insufficient or in case it should be desirable to divert a portion of the produced reagent from the process in order to prevent undue accumulation of impurities therein.

I claim:

1. In a process for recovering iodine, the steps which comprise heating silver iodide with concentrated sulphuric acid at a temperature above 270° C. to cause formation and volatilization of elemental iodine, and condensing elemental iodine so evolved.

2. In a process for recovering iodine, the steps which comprise heating silver iodide with concentrated sulphuric acid at a temperature above 270° C. to cause formation and volatilization of elemental iodine and also form silver sulphate in solution in the remaining acid, condensing elemental iodine so evolved, and subsequently diluting said remaining acid to cause precipitation of silver sulphate therefrom.

3. The method of recovering iodine from silver iodide which comprises heating said silver iodide with concentrated sulphuric acid at a temperature above 270° C., while maintaining said acid at a concentration of at least 93% $H_2SO_4$, to cause formation and volatilization of elemental iodine, and condensing elemental iodine so evolved.

4. The method of recovering iodine from silver iodide which comprises heating said silver iodide with fuming sulphuric acid at a temperature above 270° C. to cause formation and volatilization of elemental iodine, and condensing elemental iodine so evolved.

5. The method of recovering iodine from silver iodide which comprises heating said silver iodide with concentrated sulphuric acid at a temperature above 270° C. to cause formation and volatilization of elemental iodine, while introducing sulphur trioxide into said acid to react with water evolved in the reaction, and condensing elemental iodine so evolved in contact with concentrated sulphuric acid.

6. The method of recovering iodine from silver iodide which comprises heating said silver iodide with concentrated sulphuric acid at a temperature above 270° C. to cause formation and volatilization of elemental iodine, while introducing oxygen into said acid, and condensing elemental iodine so evolved in contact with concentrated sulphuric acid.

7. In a process for recovering iodine, the steps which comprise heating silver iodide with concentrated sulphuric acid at a temperature above 270° C. to cause formation and volatilization of elemental iodine, withdrawing the evolved vapors containing said elemental iodine, cooling said vapors in contact with concentrated sulphuric acid to cause condensation of said elemental iodine in contact with said last-named acid, and separating the condensed iodine.

8. In a process for recovering iodine, the steps which comprise heating silver iodide with concentrated sulphuric acid at a temperature above 270° C. to cause formation and volatilization of elemental iodine, withdrawing the evolved vapors containing elemental iodine and passing the same in contact with concentrated sulphuric acid at a sufficiently low temperature to cause condensation and collection of said elemental iodine in said last-mentioned acid, and separating the condensed iodine.

9. In a process for recovering iodine, the steps which comprise heating silver iodide with concentrated sulphuric acid at a temperature above 270° C. to cause formation and volatilization of elemental iodine and also cause evaporation of sulphuric acid, withdrawing the evolved vapors containing said elemental iodine and evaporated sulphuric acid, cooling said vapors to cause condensation of said elemental iodine and said evaporated sulphuric acid in contact with one another, and separating the condensed iodine.

10. In a process for recovering iodine from silver iodide, the step which comprises heating silver iodide with concentrated sulphuric acid at a temperature above 270° C. to cause formation and volatilization of elemental iodine.

11. In a process for recovering iodine from silver iodide, the step which comprises heating silver iodide with concentrated sulphuric acid at a temperature above 270° C. to cause formation and volatilization of elemental iodine, while introducing sulphur trioxide into said acid.

12. In a process for recovering iodine from silver iodide, the step which comprises heating silver iodide with concentrated sulphuric acid at a temperature above 270° C. to cause formation and volatilization of elemental iodine, while introducing oxygen into said acid.

LAURENCE E. HARRISON.